United States Patent
Roberts et al.

(10) Patent No.: US 6,700,693 B2
(45) Date of Patent: Mar. 2, 2004

(54) ELECTROCHROMIC DEVICES HAVING AN ELECTRON SHUTTLE

(75) Inventors: Kathy E. Roberts, East Grand Rapids, MI (US); Rongguang Lin, Holland, MI (US); Kelvin L. Baumann, Holland, MI (US); Thomas F. Guarr, Holland, MI (US); David A. Theiste, Byron Center, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 10/283,506

(22) Filed: Oct. 30, 2002

(65) Prior Publication Data

US 2003/0053187 A1 Mar. 20, 2003

Related U.S. Application Data

(63) Continuation-in-part of application No. 10/054,108, filed on Nov. 13, 2001, which is a continuation-in-part of application No. 09/724,118, filed on Nov. 28, 2000, now Pat. No. 6,445,486, which is a continuation-in-part of application No. 09/454,043, filed on Dec. 3, 1999, now Pat. No. 6,262,832.

(51) Int. Cl.[7] .................................................. G02F 1/15
(52) U.S. Cl. ....................... 359/265; 359/267; 359/268; 359/275; 359/271; 359/273
(58) Field of Search .................. 359/265–275; 345/49, 105; 348/877; 546/257; 544/347; 252/583, 600; 428/426

(56) References Cited

U.S. PATENT DOCUMENTS

| | | | |
|---|---|---|---|
| 3,766,205 A | 10/1973 | Heller et al. | |
| 4,402,573 A | 9/1983 | Jones | |
| 4,853,471 A | 8/1989 | Rody et al. | |
| 4,902,108 A | 2/1990 | Byker | |
| 5,032,498 A | 7/1991 | Rody et al. | |
| 5,140,455 A | 8/1992 | Varaprasad et al. | |
| 5,151,816 A | 9/1992 | Varaprasad et al. | |
| 5,239,406 A | 8/1993 | Lynam | |
| 5,457,564 A | 10/1995 | Leventis et al. | |
| 5,679,283 A | 10/1997 | Tonar et al. | |
| 5,724,187 A | 3/1998 | Varaprasad et al. | |
| 5,770,114 A | 6/1998 | Byker et al. | |
| 5,818,636 A | * 10/1998 | Leventis et al. | ............ 359/273 |
| 5,859,722 A | 1/1999 | Suga et al. | |
| 5,910,854 A | 6/1999 | Varaprasad et al. | |
| 5,998,617 A | 12/1999 | Srinivasa et al. | |
| 6,002,511 A | 12/1999 | Varaprasad et al. | |
| 6,020,987 A | 2/2000 | Baumann et al. | |
| 6,141,137 A | * 10/2000 | Byker et al. | ................ 359/265 |
| 6,154,306 A | 11/2000 | Varaprasad et al. | |
| 6,183,878 B1 | 2/2001 | Berneth et al. | |
| 6,187,845 B1 | 2/2001 | Renz et al. | |
| 6,188,505 B1 | 2/2001 | Lomprey et al. | |
| 6,193,912 B1 | 2/2001 | Theiste et al. | |
| 6,241,916 B1 | 6/2001 | Claussen et al. | |
| 6,262,832 B1 | 7/2001 | Lomprey et al. | |
| 6,277,307 B1 | 8/2001 | Berneth et al. | |
| 6,301,038 B1 | 10/2001 | Fitzmaurice et al. | |
| 6,445,486 B1 | 9/2002 | Lomprey et al. | |

FOREIGN PATENT DOCUMENTS

RU      SU 830456 A1      4/1980

* cited by examiner

*Primary Examiner*—Hung Xuan Dang
*Assistant Examiner*—Tuyen Tra
(74) *Attorney, Agent, or Firm*—King & Jovanovic, PLC

(57) ABSTRACT

An electrochromic device comprising: a first substantially transparent substrate having an electrically conductive material associated therewith; a second substrate having an electrically conductive material associated therewith; and an electrochromic medium contained within a chamber positioned between the first and second substrates which comprises: at least one solvent; an anodic material; a cathodic material, wherein both of the anodic and cathodic materials are electroactive and at least one of the anodic and cathodic materials is electrochromic, and wherein at least one of the anodic and cathodic materials is slow-diffusing; and an electron shuttle, wherein the electron shuttle serves to decrease switching time of the electrochromic device relative to the same without the electron shuttle.

24 Claims, 1 Drawing Sheet

ELECTROCHROMIC DEVICES HAVING AN ELECTRON SHUTTLE

CROSS-REFERENCE TO RELATED APPLICATIONS

This application is a continuation-in-part of U.S. application Ser. No. 10/054,108, filed Nov. 13, 2001, which is a continuation-in-part of U.S. application Ser. No. 09/724,118, filed Nov. 28, 2000, now U.S. Pat. No. 6,445,486 B1, which is a continuation-in-part of U.S. application Ser. No. 09/454,043, filed Dec. 3, 1999, now U.S. Pat. No. 6,262,832 B1, all of which are hereby incorporated herein by reference in their entirety.

BACKGROUND OF THE INVENTION

1. Field of the Invention

The present invention relates in general to electrochromic devices and, more particularly, to an electrochromic device having one or more slow-diffusing electroactive materials and an electron shuttle which serves to decrease the switching time of the electrochromic device relative to the same without such an electron shuttle.

2. Background Art

Electrochromic devices have been known in the art for several years. Furthermore, the utilization of one or more slow-diffusing electroactive materials in the medium of electrochromic devices has been disclosed in U.S. application Ser. No. 10/054,108 entitled "Controlled Diffusion Coefficient Electrochromic Materials For Use In Electrochromic Mediums and Associated Electrochromic Devices." While the above-identified U.S. Application discloses many benefits of utilizing one or more slow-diffusing electroactive materials, the switching times of associated electrochromic devices can be adversely affected and, in some circumstances, problematic for commercial applications.

In addition, U.S. Pat. No. 6,445,486 B1 entitled "Electroactive Materials And Beneficial Agents Having A Solublizing Moiety" discloses incorporating a solublizing moiety with electroactive materials to, in turn, enhance solubility of the electroactive material in a preferred solvent. While utilization of a solublizing moiety with electroactive materials beneficially affects the solubility characteristics of electroactive material, the solublizing moiety can adversely affect the diffusion characteristics of the same.

When an electrochromic device is in its normal rest state, (i.e. when a zero-electrical potential difference is applied) the electrochromic device is said to be in a high-transmission state. In the high-transmission state the cathodic material (i.e. the material to be reduced at the device cathode) and anodic material (i.e. the material to be oxidized at the device anode) are neither reduced nor oxidized, respectively. Typically, no coloration or very low coloration characterizes the high-transmission state, but occasionally an intentional tinting of the high-transmission state is desirable.

When a sufficient electrical potential difference is applied across the electrodes of a conventional electrochromic device, the electrochromic medium becomes colored due to oxidation of the anodic material and reduction of the cathodic material. Specifically, the anodic material is oxidized by donating one or more electrons to the anode, and the cathodic material is reduced by accepting one or more electrons from the cathode. For most commercially available electrochromic devices, application of this electrical potential difference and subsequent coloration of the medium results in reduction of transmission of the device. The reduced transmission state of the device is typically referred to as the low-transmission state.

When the electrical potential difference is removed or sufficiently reduced, the oxidized anodic material and reduced cathodic material return to their zero-potential or unactivated state, and in turn, the device returns to a high-transmission state. The complete transitioning of an electrochromic device from high to low to high transmission states is referred to as a cycle.

In the case of automotive applications of electrochromic devices, specifically electrochromic mirrors, the speed at which the device transitions from a high-transmission state to a low-transmission state, and back again is very important for driver and passenger safety. For example, if the transition to a low-transmission state is too slow, the driver may be distracted or blinded by reflection of rear-approaching headlights. Conversely, if the mirror is too slow to revert to the high-transmission state the driver may not be able to see possible hazards in the rear view. Currently available electrochromic devices switch at acceptable speeds which do not pose safety risks. However, as was previously discussed, emerging technologies, particularly those involving automotive mirror applications which utilize one or more slow-diffusing electroactive materials, can present problematic switching times.

It has now been surprisingly discovered that incorporation of one or more anodic and/or cathodic electron shuttles as disclosed herein serves to decrease switching time of an associated electrochromic device relative to the same without the electron shuttle(s).

It is therefore an object of the present invention to provide an electrochromic device having one or more slow-diffusing electroactive materials and an electron shuttle that remedies the aforementioned detriments and/or complications associated with the incorporation of one or more slow-diffusing electroactive materials into the medium of an electrochromic device.

SUMMARY OF THE INVENTION

The present invention is directed to an electrochromic medium for use in an electrochromic device which comprises: (1) at least one solvent; (2) an anodic material, wherein the anodic material is slow-diffusing; (3) a cathodic material, wherein both of the anodic and cathodic materials are electroactive and at least one of the anodic and cathodic materials is electrochromic; and (4) an anodic electron shuttle, wherein the anodic electron shuttle serves to decrease switching time of the electrochromic device relative to the same without the anodic electron shuttle.

The present invention is also directed to an electrochromic medium for use in an electrochromic device which comprises: (1) at least one solvent; (2) an anodic material; (3) a cathodic material, wherein the cathodic material is slow-diffusing, and further wherein both of the anodic and cathodic materials are electroactive and at least one of the anodic and cathodic materials is electrochromic; and (4) a cathodic electron shuttle, wherein the cathodic electron shuttle serves to decrease switching time of the electrochromic device relative to the same without the cathodic electron shuttle.

These and other objectives of the present invention will become apparent in light of the present specification, claims, and drawings.

BRIEF DESCRIPTION OF THE DRAWINGS

The invention will now be described with reference to the drawings wherein.

DETAILED DESCRIPTION OF THE INVENTION

Figure 1:
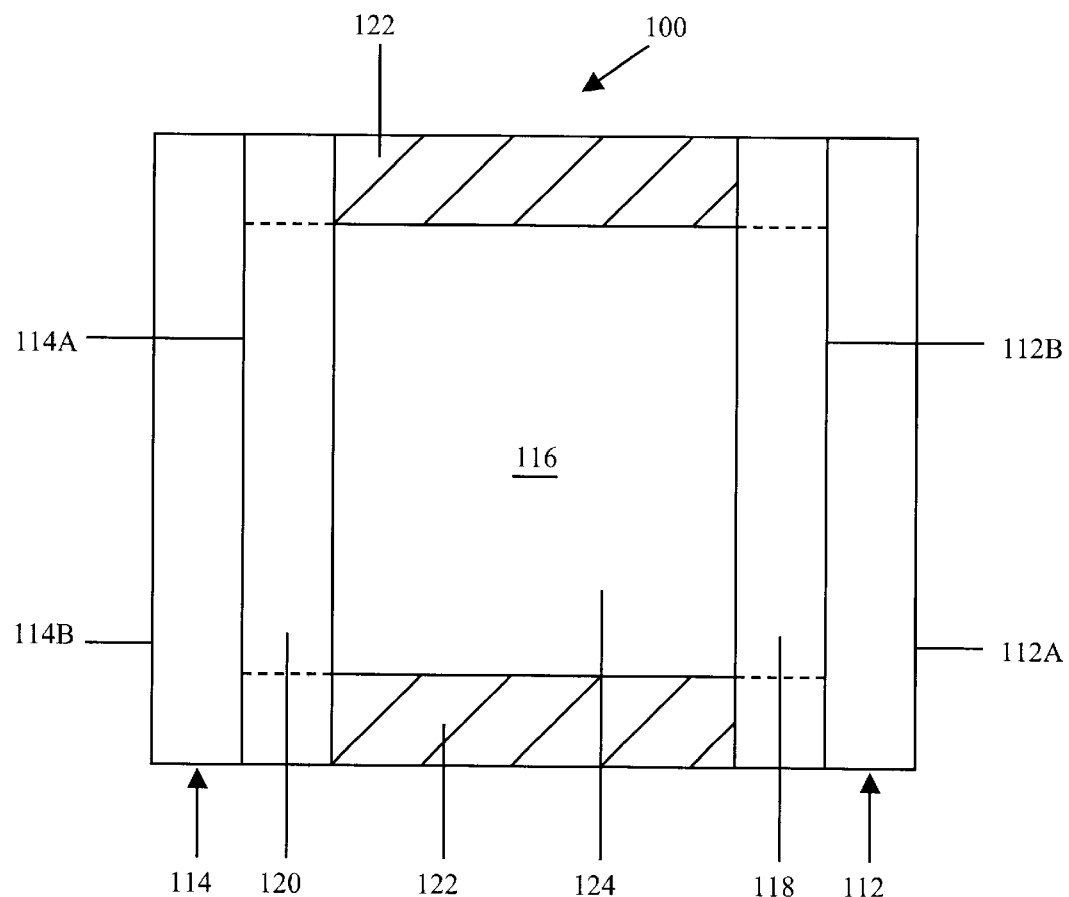
FIG. 1 of the drawings is a cross-sectional schematic representation of an electrochromic device fabricated in accordance with the present invention.

Referring now to the drawings and to FIG. 1 in particular, a cross-sectional schematic representation of electrochromic device 100 is shown, which generally comprises first substrate 112 having front surface 112A and rear surface 112B, second substrate 114 having front surface 114A and rear surface 114B, and chamber 116 for containing electrochromic medium 124. It will be understood that electrochromic device 100 may comprise, for illustrative purposes only, a mirror, a window, a display device, a contrast enhancement filter, and the like. It will be further understood that FIG. 1 is merely a schematic representation of electrochromic device 100. As such, some of the components have been distorted from their actual scale for pictorial clarity. Indeed, numerous other electrochromic device configurations are contemplated for use, including those disclosed in U.S. Pat. No. 5,818,625 entitled "Electrochromic Rearview Mirror Incorporating A Third Surface Metal Reflector," and U.S. application Ser. No. 09/343,345 entitled "Electrode Design For Electrochromic Devices," both of which are hereby incorporated herein by reference in their entirety.

First substrate 112 may be fabricated from any one of a number of materials that are transparent or substantially transparent in the visible region of the electromagnetic spectrum, such as, for example, borosilicate glass, soda lime glass, float glass, natural and synthetic polymeric resins, plastics, and/or composites including Topas®, which is commercially available from Ticona of Summit, N.J. First substrate 112 is preferably fabricated from a sheet of glass having a thickness ranging from approximately 0.5 millimeters (mm) to approximately 12.7 mm. Of course, the thickness of the substrate will depend largely upon the particular application of the electrochromic device. While particular substrate materials have been disclosed, for illustrative purposes only, it will be understood that numerous other substrate materials are likewise contemplated for use—so long as the materials are at least substantially transparent and exhibit appropriate physical properties, such as strength, to be able to operate effectively in conditions of intended use. Indeed, electrochromic devices in accordance with the present invention can be, during normal operation, exposed to extreme temperature variation as well as substantial UV radiation, emanating primarily from the sun.

Second substrate 114 may be fabricated from similar materials as that of first substrate 112. However, if the electrochromic device is a mirror, then the requisite of substantial transparency is not necessary. As such, second substrate 114 may, alternatively, comprise polymers, metals, glass, and ceramics—to name a few. Second substrate 114 is preferably fabricated from a sheet of glass having a thickness ranging from approximately 0.5 mm to approximately 12.7 mm. If first and second substrates 112 and 114, respectively, are fabricated from sheets of glass, then the glass can optionally be tempered, heat strengthened, and/or chemically strengthened, prior to or subsequent to being coated with layers of electrically conductive material (118 and 120).

One or more layers of electrically conductive material 118 are associated with rear surface 112B of first substrate 112. These layers serve as an electrode for the electrochromic device. Electrically conductive material 118 is desirably a material that: (a) is substantially transparent in the visible region of the electromagnetic spectrum; (b) bonds reasonably well to first substrate 112; (c) maintains this bond when associated with a sealing member; (d) is generally resistant to corrosion from materials contained within the electrochromic device or the atmosphere; and (e) exhibits minimal diffusion or specular reflectance as well as sufficient electrical conductance. It is contemplated that electrically conductive material 118 may be fabricated from fluorine doped tin oxide (FTO), for example TEC glass, which is commercially available from Libbey Owens-Ford-Co., of Toledo, Ohio, indium/tin oxide (ITO), doped zinc oxide or other materials known to those having ordinary skill in the art.

Electrically conductive material 120 is preferably associated with front surface 114A of second substrate 114, and is operatively bonded to electrically conductive material 118 by sealing member 122. As can be seen in FIG. 1, once bonded, sealing member 122 and the juxtaposed portions of electrically conductive materials 118 and 120 serve to define an inner peripheral geometry of chamber 116.

Electrically conductive material 120 may vary depending upon the intended use of the electrochromic device. For example, if the electrochromic device is a mirror, then the material may comprise a transparent conductive coating similar to electrically conductive material 118 (in which case a reflector is associated with rear surface 114B of second substrate 114). Alternatively, electrically conductive material 120 may comprise a layer of reflective material in accordance with the teachings of previously referenced and incorporated U.S. Pat. No. 5,818,625. In this case, electrically conductive material 120 is associated with front surface 114A of second substrate 114. Typical coatings for this type of reflector include chromium, rhodium, ruthenium, silver, silver alloys, and combinations thereof.

Sealing member 122 may comprise any material that is capable of being adhesively bonded to the electrically conductive materials 118 and 120 to, in turn, seal chamber 116 so that electrochromic medium 124 does not inadvertently leak out of the chamber. As is shown in dashed lines in FIG. 1, it is also contemplated that the sealing member extend all the way to rear surface 112B and front surface 114A of their respective substrates. In such an embodiment, the layers of electrically conductive material 118 and 120 may be partially removed where the sealing member 122 is positioned. If electrically conductive materials 118 and 120 are not associated with their respective substrates, then sealing member 122 preferably bonds well to glass. It will be understood that sealing member 122 can be fabricated from any one of a number of materials including, for example, those disclosed in: U.S. Pat. No. 4,297,401 entitled "Liquid Crystal Display And Photopolymerizable Sealant Therefor;" U.S. Pat. No. 4,418,102 entitled "Liquid Crystal Displays Having Improved Hermetic Seal;" U.S. Pat. No. 4,695,490 entitled "Seal For Liquid Crystal Display;" U.S. Pat. No. 5,596,023 entitled "Sealing Material For Liquid Crystal Display Panel, And Liquid Crystal Display Panel Using It;" U.S. Pat. No. 5,596,024 entitled "Sealing Composition For Liquid Crystal;" and U.S. Pat. No. 6,157,480 entitled "Seal For Electrochromic Devices," all of which are hereby incorporated herein by reference in their entirety.

For purposes of the present disclosure, electrochromic medium 124 comprises an anodic material, a cathodic material, wherein at least one of the anodic and cathodic materials is slow-diffusing, at least one solvent, and a electron shuttle which, as will be shown experimentally below, serves to reduce switching time of electrochromic device 100 relative to the same without the electron shuttle.

Typically both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Furthermore, it will be understood that the term "electrochromic" will be defined herein, regardless of its ordinary meaning, as a material that exhibits a change in its extinction coefficient at one or more wavelengths upon exposure to a particular electrical potential difference. Additionally, it will be understood that the term "slow-diffusing" with respect to an anodic or cathodic material will be defined herein, regardless of its ordinary meaning, as a rate of diffusion substantially less than a similar chromophore. Preferably, the slow-diffusing material comprises a diffusion coefficient which is approximately 1.5 times less than a similar chromophore.

Electrochromic medium 124 is preferably chosen from one of the following categories:

(1) Single-layer, single-phase—The electrochromic medium may comprise a single-layer of material which may include small non-homogenous regions and includes solution-phase devices where a material may be contained in solution in the ionically conducting electrolyte which remains in solution in the electrolyte when electrochemically oxidized or reduced. Solution phase electroactive materials may be contained in the continuous solution-phase of a gel medium in accordance with the teachings of U.S. Pat. No. 5,928,572 entitled "Electrochromic Layer And Devices Comprising Same," and International Patent Application Serial No. PCT/US98/05570 entitled "Electrochromic Polymeric Solid Films, Manufacturing Electrochromic Devices Using Such Solid Films, And Processes For Making Such Solid Films And Devices," both of which are hereby incorporated herein by reference in their entirety.

More than one anodic and cathodic material can be combined to give a pre-selected color as described in: U.S. Pat. No. 5,998,617 entitled "Electrochromic Compounds;" U.S. Pat. No. 6,020,987 entitled "Electrochromic Medium Capable Of Producing A Pre-selected Color;" U.S. Pat. No. 6,037,471 entitled "Electrochromic Compounds;" and U.S. Pat. No. 6,141,137 entitled "Electrochromic Media For Producing A Preselected Color," all of which are hereby incorporated herein by reference in their entirety.

The anodic and cathodic materials may also be combined or linked by a bridging unit as described in U.S. Pat. No. 6,241,916 entitled "Electrochromic System" and/or U.S. Pat. Pub. No. 2002/00152214 A1 entitled "Electrochromic Device," which are hereby incorporated herein by reference in its entirety. The electrochromic materials may also include near infrared (NIR) absorbing compounds as described in U.S. Pat. No. 6,193,912 entitled "Near Infrared-Absorbing Electrochromic Compounds And Devices Comprising Same" which is also hereby incorporated herein by reference in its entirety.

It is also possible to link anodic materials or cathodic materials by similar methods. The concepts described in these patents can further be combined to yield a variety of electroactive materials that are linked or coupled, including linking of a redox buffer such as linking of a color-stabilizing moiety to an anodic and/or cathodic material.

The anodic and cathodic electrochromic materials can also include coupled materials as described in U.S. Pat. No. 6,249,369 entitled "Coupled Electrochromic Compounds With Photostable Oxidation States" which is hereby incorporated herein by reference in its entirety.

The concentration of the electrochromic materials can be selected as taught in U.S. Pat. No. 6,137,620 entitled "Electrochromic Media With Concentration Enhanced Stability, Process For The Preparation Thereof, and Use In Electrochromic Devices" the entirety of which is hereby incorporated herein by reference.

Additionally, a single-layer, single-phase medium may include a medium where the anodic and cathodic materials are incorporated into a polymer matrix as is described in International Application Serial No. PCT/WO99/02621 entitled "Electrochromic Polymer System" which is hereby incorporated herein by reference in its entirety, and International Patent Application Serial No. PCT/US98/05570 entitled "Electrochromic Polymeric Solid Films, Manufacturing Electrochromic Devices Using Such Solid Films, And Processes For Making Such Solid Films And Devices."

(2) Multi-layer—The medium may be made up in layers and includes a material attached directly to an electrically conducting electrode or confined in close proximity thereto which remains attached or confined when electrochemically oxidized or reduced.

(3) Multi-phase—One or more materials in the medium undergoes a change in phase during the operation of the device, for example a material contained in solution in the ionically conducting electrolyte forms a layer on the electrically conducting electrode when electrochemically oxidized or reduced.

In addition, electrochromic medium 124 may comprise other materials, such as light absorbers, light stabilizers, thermal stabilizers, antioxidants, thickeners, viscosity modifiers, tint providing agents, redox buffers, and mixtures thereof. Suitable UV-stabilizers may include: the material ethyl-2-cyano-3,3-diphenyl acrylate, sold by BASF of Parsippany, N.Y., under the trademark Uvinul N-35 and by Aceto Corp., of Flushing, N.Y., under the trademark Viosorb 910; the material (2-ethylhexyl)-2-cyano-3,3-diphenyl acrylate, sold by BASF under the trademark Uvinul N-539; the material 2-(2'-hydroxy-4'-methylphenyl)benzotriazole, sold by Ciba-Geigy Corp. under the trademark Tinuvin P; the material 3-[3-(2H-benzotriazole-2-yl)-5-(1,1-dimethylethyl)-4-hydroxyphenyl]propionic acid pentyl ester prepared from Tinuvin 213, sold by Ciba-Geigy Corp., via conventional hydrolysis followed by conventional esterification (hereinafter "Tinuvin PE"); the material 2,4-dihydroxybenzophenone sold by, among many others, Aldrich Chemical Co.; the material 2-hydroxy-4-methoxybenzophenone sold by American Cyanamid under the trademark Cyasorb UV 9; and the material 2-ethyl-2'-ethoxyalanilide sold by Sandoz Color & Chemicals under the trademark Sanduvor VSU—to name a few.

For purposes of the present invention, anodic materials may include any one of a number of materials including ferrocene, substituted ferrocenes, substituted ferrocenyl salts, substituted phenazines, phenothiazine, substituted phenothiazines, thianthrene, substituted thianthrenes. Examples of anodic materials may include di-tert-butyl-diethylferrocene, 5,10-di methyl-5,10-dihydrophenazine, 3,7,10-trimethylpheno-thiazine, 2,3,7,8-tetramethoxythianthrene, and 10-methylphenothiazine. It is also contemplated that the anodic material may comprise a polymer film, such as polyaniline, polythiophenes, polymeric metallocenes, or a solid transition metal oxide, including, but not limited to, oxides of vanadium, nickel, iridium, as well as numerous heterocyclic compounds, etcetera. It will be understood that numerous other anodic materials are contemplated for use including those disclosed in U.S. Pat. No. 4,902,108 entitled "Single-Compartment, Self-Erasing, Solution-Phase Electrochromic Devices, Solutions For Use Therein, And Uses Thereof," as well as U.S. Pat. No. 6,188,505 B1 entitled "Color-Stabilized Electrochromic Devices," and U.S. application Ser. No. 10/054,108 entitled "Controlled Diffusion Coefficient Electrochromic Materials For Use In Electrochromic Mediums And Associated Electrochromic Devices," all of which are hereby incorporated herein by reference in their entirety.

Cathodic materials may include, for example, viologens, such as methyl viologen tetrafluoroborate, octyl viologen tetrafluoroborate, or benzyl viologen tetrafluoroborate. It will be understood that the preparation and/or commercial availability for each of the above-identified cathodic materials is well known in the art. See, for example, "The Bipyridinium Herbicides" by L. A. Summers (Academic Press 1980). While specific cathodic materials have been provided for illustrative purposes only, numerous other conventional cathodic materials are likewise contemplated for use including, but by no means limited to, those disclosed in previously referenced and incorporated U.S. Pat. No. 4,902,108 and U.S. application Ser. No. 10/054,108 entitled "Controlled Diffusion Coefficient Electrochromic Materials For Use In Electrochromic Mediums And Associated Electrochromic Devices." Moreover, it is contemplated that the cathodic material may comprise a polymer film, such as various substituted polythiophenes, polymeric viologens, an inorganic film, or a solid transition metal oxide, including, but not limited to, tungsten oxide.

For illustrative purposes only, the concentration of the anodic and cathodic materials can range from approximately 1 millimolar (mM) to approximately 500 mM and more preferably from approximately 2 mM to approximately 100 mM. While particular concentrations of the anodic as well as cathodic materials have been provided, it will be understood that the desired concentration may vary greatly depending upon the geometric configuration of the chamber containing electrochromic medium 124.

In accordance with the present invention, the electrochromic medium also comprises one or more electron shuttles which serve to decrease the switching time of the electrochromic devices relative to the same without such an electron shuttle. It will be understood that the electrochromic medium may contain either an anodic or cathodic electron shuttle, or both.

In a first embodiment of the present invention, an anodic electron shuttle assists a slow-diffusing anodic material in donating electrons to an anode, and/or transferring electrons to and/or from an electrode and/or other electrochromic material. For purposes of the present invention, the anodic electron shuttle comprises a diffusion coefficient which is approximately 1.5 times faster than the anodic material. Although it is not necessary, it is preferred that the anodic electron shuttle comprises a redox potential which lies between that of the anodic and cathodic materials. As will be shown experimentally below, one example of an anodic electron shuttle is 5,10-dimethyl-5,10-dihydrophenazine (DMP) ($E1_{1/2}$=+300 mV (reported on a scale where DMP is characterized as +300 mV)) in the presence of bis-5,10-[3-(triethylammonium)propyl]-5,10-dihydrophenazine bis (tetrafluoroborate) ($E1_{1/2}$=+340 mV) (i.e. the slow-diffusing anodic material) and octylviologen $[BF_4]_2$ ($E1_{1/2}$=−300 mV) (i.e. the cathodic material). While DMP has been shown, for illustrative purposes only, as an anodic electron shuttle, it will be understood that any one of a number of materials that would be known to those with ordinary skill in the art having the present disclosure before them are likewise contemplated for use—the only experimentally uncovered limitation being that the anodic electron shuttle comprise a diffusion coefficient approximately 1.5 times faster than the anodic material. As an additional benefit, the anodic electron shuttle may exhibit material coloration upon oxidation.

In a second embodiment of the present invention, a cathodic electron shuttle assists a slow-diffusing cathodic material in accepting electrons from a cathode, and/or transferring electrons to and/or from an electrode and/or other electrochromic material. For purposes of the present invention, the cathodic electron shuttle comprises a diffusion coefficient which is approximately 1.5 times faster than the cathodic material. Although it is not necessary, it is preferred that the cathodic electron shuttle comprises a redox potential which lies between that of the anodic and cathodic materials. As will be shown experimentally below, one example of a cathodic shuttle is benzylviologen $[BF_4]_2$ ($E1_{1/2}$=−236 mV) in the presence of 1,1'-bis(6-(triphenylphosphonium)hexyl)-4,4'-dipyridinium tetrakis(tetrafluoroborate) (TPPHV) (i.e. the slow-diffusing cathodic material) ($E1_{1/2}$=−290 mV) and 5,10-dimethyl-5,10-dihydrophenazine ($E1_{1/2}$+300 mV) (i.e. the anodic material). While benzylviologen $[BF_4]_2$ has been shown, for illustrative purposes only, as a cathodic electron shuttle, it will be understood that any one of a number of materials that would be known to those with ordinary skill in the art having the present disclosure before them are likewise contemplated for use—the only experimentally uncovered limitation being that the cathodic electron shuttle comprise a diffusion coefficient approximately 1.5 times faster than the cathodic material. As an additional benefit, the cathodic electron shuttle may exhibit material coloration upon reduction.

For illustrative purposes only, the concentration of the anodic and/or cathodic electron shuttles can range from approximately 0.5 mM to approximately 100 mM and more preferably from approximately 2 mM to approximately 50 mM. While particular concentrations of the anodic as well as cathodic electron shuttles have been provided, it will be understood that the desired concentration may vary greatly depending upon the geometric configuration of the chamber containing electrochromic medium 124. It will be understood that most of the benefit can be achieved with a small amount of shuttle material (approximately 5% to approximately 10% relative to the associated anodic and/or cathodic material). However, additional beneficial results relative to switching time have been recognized with increased concentrations of anodic and/or cathodic electron shuttles. While clearing times have been observed as being beneficially affected by the use of one or more anodic and/or cathodic shuttles, coloring times, albeit not necessarily to the same extent, have also been beneficially affected, which, in turn, beneficially affects overall switching times.

For purposes of the present disclosure, the solvent of electrochromic medium 124 may comprise any one of a number of common, commercially available solvents including 3-methylsulfolane, dimethyl sulfoxide, dimethyl formamide, tetraglyme and other polyethers; alcohols such as ethoxyethanol; nitrites, such as acetonitrile, glutaronitrile, 3-hydroxypropionitrile, and 2-methylglutaronitrile; ketones including 2-acetylbutyrolactone, and cyclopentanone; cyclic esters including beta-propiolactone, gamma-butyrolactone, and gamma-valerolactone; propylene carbonate (PC), ethylene carbonate; and homogenous mixtures of the same. While specific solvents have been disclosed as being associated with the electrochromic medium, numerous other solvents that would be known to those having ordinary skill in the art having the present disclosure before them are likewise contemplated for use.

Electrochromic devices having as a component part an electrochromic medium comprising one or more electron shuttles can be used in a wide variety of applications wherein the transmitted or reflected light can be modulated. Such devices include rear-view mirrors for vehicles; windows for the exterior of a building, home or vehicle; skylights for buildings including tubular light filters; windows in office or room partitions; display devices; contrast enhancement filters for displays; light filters for photographic devices and light sensors; and indicators for power cells as well as primary and secondary electrochemical cells.

The electrochromic media of the present invention utilize many different materials, the preparation and/or commercially available sources are provided herein, unless the material is well known in the art. It will be understood that, unless specified otherwise, the starting reagents are commercially available from Aldrich Chemical Co., of Milwaukee, Wis., Ciba-Geigy Corp., and/or other common chemical suppliers. It will be further understood that conventional chemical abbreviations will be used when appropriate including the following: grams (g); milliliters (mL); moles (mol); millimoles (mmol); molar (M); millimolar (mM); pounds per square inch (psi); hours (h); and degrees Centigrade (° C.).

The following table provides anodic materials, cathodic materials, and electron shuttles utilized in the experiments below as well as some suitable alternatives along with corresponding diffusion coefficients which were obtained in accordance with previously referenced and incorporated U.S. application Ser. No. 10/054,108 entitled "Controlled Diffusion Coefficient Electrochromic Materials For Use In Electrochromic Mediums And Associated Electrochromic Devices."

| Anodic Material Cathodic Material Electron Shuttle | Preparation | D (cm$^2$/s) |
|---|---|---|
| Methylviologen [BF$_4$]$_2$ | Common preparation in open literature* | 6.79 × 10$^{-6}$ |
| Ethylviologen [BF$_4$]$_2$ | Common preparation in open literature* | 6.03 × 10$^{-6}$ |
| Octylviologen [BF$_4$]$_2$ | Common preparation in open literature* | 4.07 × 10$^{-6}$ |
| Benzylviologen [BF$_4$]$_2$ | Common preparation in open literature* | 3.10 × 10$^{-6}$ |
| 1,1'-bis(3-(triphenylphosphonium)propyl)-4,4'-dipyridinium tetrakis(tetrafluoroborate) | See U.S. application Ser. No. 10/054,108 | 1.94 × 10$^{-6}$ |
| 1,1'-bis(6-(triphenylphosphonium)hexyl)-4,4'-dipyridinium tetrakis(tetrafluoroborate) | See U.S. application Ser. No. 10/054,108 | 2.01 × 10$^{-6}$ |
| N,N'-bis(3-(triphenylphosphonium)propyl)-3,8-phenanthrolinium tetrakis(tetrafluoroborate) | See U.S. application Ser. No. 10/054,108 | 1.90 × 10$^{-6}$ |
| N,N'-bis(5-(triphenylphosphonium)pentyl)-1,4,5,8-naphthalenetetracarboxylic diimidium bis(tetrafluoroborate) | See U.S. application Ser. No. 10/054,108 | 3.30 × 10$^{-6}$ |
| 5,10-dimethyl-5,10-dihydrophenazine (DMP) | See U.S. Pat. No. 6,242,602 B1 | 1.14 × 10$^{-5}$ |
| Bis-5,10-[2-(triethylammonium)ethyl]-5,10-dihydrophenazine bis(tetrafluoroborate) | See U.S. application Ser. No. 10/054,108 | 2.58 × 10$^{-6}$ |
| Bis-5,10-[3-(triethylammonium)propyl]-5,10-dihydrophenazine bis(tetrafluoroborate) | Prepared in an analogous manner to the butyl derivative provided in U.S. application Ser. No. 10/054,108 | 2.18 × 10$^{-6}$ |
| Bis-5,10-[4-(triethylammonium)butyl]-5,10-dihydrophenazine bis(tetrafluoroborate) | See U.S. application Ser. No. 10/054,108 | N/A |
| 3,10-dimethoxy-7,14-triethylammoniumbutyltripheno-dithiazine tetrafluoroborate | See U.S. application Ser. No. 10/054,108 | 2.69 × 10$^{-6}$ |

*See, for example, "The Bipyridinium Herbicides" by L. A. Summers (Academic Press 1980)

In support of the present invention, several experiments were conducted wherein the clearing times of electrochromic devices having one or more electron shuttles were compared to otherwise analogously configured electrochromic devices without the aforementioned electron shuttles.

It will be understood that in each of the experiments provided below, the electrochromic medium materials were dissolved in propylene carbonate (PC).

Experiment No. 1

In this experiment two electrochromic media were prepared by mixing the following materials together in the concentrations provided below:

Experiment No. 1A (No Cathodic Shuttle)

| Component | Material | Concentration |
|---|---|---|
| Cathodic | 1,1'-bis(6-(triphenylphosphonium)hexyl)-4,4'-dipyridinium tetrakis(tetrafluoroborate) | 36.0 mM |
| Anodic | 5,10-dimethyl-5,10-dihydrophenazine | 18.0 mM |
| Electron Shuttle | None | — |
| UV-Stabilizer | Tinuvin 384* | 25.0 mM |
| Redox Buffer A | 1,1',2,2',3,3',4,4',5,5'-decamethylferrocene** | 0.50 mM |
| Redox Buffer B | 1,1',2,2',3,3',4,4',5,5'-decamethylferrocinium [BF$_4$]** | 0.50 mM |
| Thickener | PMMA | 3% by wt. |

*Commercially available from Ciba-Geigy Corp.
**See U.S. Pat. Nos.: 6,188,505 B1 and 6,392,783 B1

Experiment No. 1B (Cathodic Shuttle)

| Component | Material | Concentration |
|---|---|---|
| Cathodic | 1,1'-bis(6-(triphenylphosphonium)hexyl)-4,4'-dipyridinium tetrakis(tetrafluoroborate) | 33.0 mM |
| Anodic | 5,10-dimethyl-5,10-dihydrophenazine | 18.0 mM |
| Electron Shuttle | Benzylviologen [BF$_4$]$_2$ | 3.00 mM |
| UV-Stabilizer | Tinuvin 384* | 25.0 mM |
| Redox Buffer A | 1,1',2,2',3,3',4,4',5,5'-decamethylferrocene** | 0.50 mM |

-continued

| Experiment No. 1B (Cathodic Shuttle) | | |
|---|---|---|
| Component | Material | Concentration |
| Redox Buffer B | 1,1',2,2',3,3',4,4',5,5'-decamethylferrocinium [BF$_4$]** | 0.50 mM |
| Thickener | PMMA | 3% by wt. |

*Commercially available from Ciba-Geigy Corp.
**See U.S. Pat. Nos.: 6,188,505 B1 and 6,392,783 B1

As can be seen, Experiment No. 1A does not include an electron shuttle and Experiment No. 1B comprises benzylviologen [BF$_4$]$_2$ as an electron shuttle.

Each of the media were associated with at least two electrochromic mirrors for testing. Specifically, the mirrors comprised two 2×5 inch substrates. Surface 112B of the first substrate (112) was coated with generally clear, conductive indium/tin oxide (ITO), and the second substrate (114) was coated with indium/tin oxide (ITO) on surface 114A with a reflector on rear surface 114B. The substrates were spaced 250 microns apart for accommodating the medium. A plurality of mirrors were filled with each solution via conventional vacuum backfilling. Each device was then darkened by applying 1.2V. After a low reflectance condition was achieved, the mirror leads were shorted and the reflectance was monitored and recorded at 0.1 second intervals. The time for an individual mirror to go from just under 25% reflectance to 60% reflectance was then tallied and the average time for the mirrors was calculated. The results for Experiments 1A-1B are provided below

| Experiment Number | Average Clearing Time (Seconds) |
|---|---|
| 1A (No Cathodic Electron Shuttle) | 8.6 (2 mirrors) |
| 1B (Cathodic Electron Shuttle) | 7.1 (4 mirrors) |

As can be seen the mirrors of Experiment No. 1A (No Cathodic Electron Shuttle) exhibited an average clearing time of 8.6 seconds, and the mirrors of Experiment No. 1B exhibited an average clearing time of 7.1 seconds—a reduction in clearing time by more than 15%.

Experiment No. 2

In this experiment two electrochromic media were prepared by mixing the following materials together in the concentrations provided below:

| Experiment No. 2A (No Anodic Shuttle) | | |
|---|---|---|
| Component | Material | Concentration |
| Cathodic | Octylviologen [BF$_4$]$_2$ | 28.0 mM |
| Anodic | Bis-5,10-[3-(triethyl-ammonium)propyl]-5,10-dihydrophenazine bis(tetrafluoroborate) | 22.0 mM |
| Electron Shuttle | None | — |
| UV-Stabilizer | Tinuvin 384* | 25.0 mM |
| Thickener | PMMA | 3% by wt. |

*Commercially available from Ciba-Geigy Corp.

| Experiment No. 2B (Anodic Shuttle) | | |
|---|---|---|
| Component | Material | Concentration |
| Cathodic | Octylviologen [BF$_4$]$_2$ | 28.0 mM |
| Anodic | Bis-5,10-[3-(triethyl-ammonium)propyl]-5,10-dihydrophenazine bis(tetrafluoroborate) | 20.0 mM |
| Electron Shuttle | 5,10-dimethyl-5,10-dihydrophenazine | 2.00 mM |
| UV-Stabilizer | Tinuvin 384* | 25.0 mM |
| Thickener | PMMA | 3% by wt. |

*Commercially available from Ciba-Geigy Corp.

As can be seen, Experiment No. 2A does not include an electron shuttle and Experiment No. 2B comprises 5,10-dimethyl-5,10-dihydrophenazine as an electron shuttle.

Each of the media were associated with at least two electrochromic mirrors for testing. Specifically, the mirrors comprised two 2×5 inch substrates. Surface 112B of the first substrate (112) was coated with generally clear, conductive indium/tin oxide (ITO), and the second substrate (114) was coated with indium/tin oxide (ITO) on surface 114A with a reflector on rear surface 114B. The substrates were spaced 210 microns apart for accommodating the medium. A plurality of mirrors were filled with each solution via conventional vacuum backfilling. Each device was then darkened by applying 1.2V. After a low reflectance condition was achieved, the mirror leads were shorted and the reflectance was monitored and recorded at 0.1 second intervals. The time for an individual mirror to go from just under 25% reflectance to 60% reflectance was then tallied and the average time for the mirrors was calculated. The results for Experiments 2A-2B are provided below

| Experiment Number | Average Clearing Time (Seconds) |
|---|---|
| 2A (No Anodic Electron Shuttle) | 18.6 (5 mirrors) |
| 2B (Anodic Electron Shuttle) | 15.8 (6 mirrors) |

As can be seen the mirrors of Experiment No. 2A (No Anodic Electron Shuttle) exhibited an average clearing time of 18.6 seconds, and the mirrors of Experiment No. 2B exhibited an average clearing time of 15.8 seconds—a reduction in clearing time by more than 15%.

While the invention has been described in detail herein in accordance with certain preferred embodiments thereof, many modifications and changes therein may be effected by those skilled in the art. Accordingly, it is our intent to be limited only by the scope of the appending claims and not by way of details and instrumentalities describing the embodiments shown herein.

What is claimed is:
1. An electrochromic device, comprising:
   a first substantially transparent substrate having an electrically conductive material associated therewith;
   a second substrate having an electrically conductive material associated therewith; and
   an electrochromic medium contained within a chamber positioned between the first and second substrates which comprises:
   at least one solvent;
   an anodic material, wherein the anodic material is slow-diffusing;
   a cathodic material, wherein both of the anodic and cathodic materials are electroactive and at least one of the anodic and cathodic materials is electrochromic; and an anodic electron shuttle, wherein the anodic electron shuttle serves to decrease switching time of the electrochromic device relative to the same without the anodic electron shuttle.

2. The electrochromic device according to claim 1, wherein the anodic electron shuttle comprises a diffusion coefficient greater than approximately 1.5 times that of the anodic material.

3. The electrochromic device according to claim 1, wherein the anodic electron shuttle comprises a diffusion coefficient greater than approximately 2.0 times that of the anodic material.

4. The electrochromic device according to claim 1, wherein the anodic electron shuttle is materially colored upon oxidation.

5. The electrochromic device according to claim 1, wherein the anodic electron shuttle serves to decrease clearing time of the electrochromic device by at least 10% relative to the same without the anodic electron shuttle.

6. The electrochromic device according to claim 1, wherein the anodic electron shuttle serves to decrease clearing time of the electrochromic device by at least 15% relative to the same without the anodic electron shuttle.

7. The electrochromic device according to claim 1, wherein the concentration of the anodic electron shuttle ranges from approximately 0.5 mM to approximately 50 mM.

8. The electrochromic device according to claim 1, wherein the concentration of the anodic electron shuttle is at least approximately 5% of the concentration of the anodic material.

9. An electrochromic device, comprising:
a first substantially transparent substrate having an electrically conductive material associated therewith;
a second substrate having an electrically conductive material associated therewith; and
an electrochromic medium contained within a chamber positioned between the first and second substrates which comprises:
at least one solvent;
a cathodic material, wherein the cathodic material is slow-diffusing;
an anodic material, wherein both of the anodic and cathodic materials are electroactive and at least one of the anodic and cathodic materials is electrochromic; and
a cathodic electron shuttle, wherein the cathodic electron shuttle serves to decrease switching time of the electrochromic device relative to the same without the cathodic electron shuttle.

10. The electrochromic device according to claim 9, wherein the cathodic electron shuttle comprises a diffusion coefficient greater than approximately 1.5 times that of the cathodic material.

11. The electrochromic device according to claim 9, wherein the cathodic electron shuttle comprises a diffusion coefficient greater than approximately 2.0 times that of the cathodic material.

12. The electrochromic device according to claim 9, wherein the cathodic electron shuttle is materially colored upon reduction.

13. The electrochromic device according to claim 9, wherein the cathodic electron shuttle serves to decrease clearing time of the electrochromic device by at least 10% relative to the same without the cathodic electron shuttle.

14. The electrochromic device according to claim 9, wherein the cathodic electron shuttle serves to decrease clearing time of the electrochromic device by at least 15% relative to the same without the cathodic electron shuttle.

15. The electrochromic device according to claim 9, wherein the concentration of the cathodic electron shuttle ranges from approximately 0.5 mM to approximately 50 mM.

16. The electrochromic device according to claim 9, wherein the concentration of the cathodic electron shuttle is at least approximately 5% of the concentration of the cathodic material.

17. An electrochromic device, comprising:
a first substantially transparent substrate having an electrically conductive material associated therewith;
a second substrate having an electrically conductive material associated therewith; and
an electrochromic medium contained within a chamber positioned between the first and second substrates which comprises:
at least one solvent;
a cathodic material, wherein the cathodic materials is slow-diffusing;
an anodic material, wherein the anodic materials is slow-diffusing, and further wherein both of the anodic and cathodic materials are electroactive and at least one of the anodic and cathodic materials is electrochromic; and
an anodic electron shuttle and a cathodic electron shuttle, wherein the anodic and cathodic electron shuttles serve to decrease switching time of the electrochromic device relative to the same without the electron shuttle.

18. The electrochromic device according to claim 17, wherein the anodic and cathodic electron shuttles comprise diffusion coefficients greater than approximately 1.5 times that of their respective anodic and cathodic materials.

19. The electrochromic device according to claim 17, wherein the anodic and cathodic electron shuttles comprise diffusion coefficients greater than approximately 2.0 times that of their respective anodic and cathodic materials.

20. The electrochromic device according to claim 17, wherein the anodic electron shuttle is materially colored upon oxidation and the cathodic electron shuttle is materially colored upon reduction.

21. The electrochromic device according to claim 17, wherein the anodic and cathodic electron shuttles serve to decrease clearing time of the electrochromic device by at least 10% relative to the same without the anodic and cathodic electron shuttles.

22. The electrochromic device according to claim 17, wherein the anodic and cathodic electron shuttles serve to decrease clearing time of the electrochromic device by at least 15% relative to the same without the anodic and cathodic electron shuttles.

23. The electrochromic device according to claim 17, wherein the concentration of the anodic and cathodic electron shuttles individually ranges from approximately 0.5 mM to approximately 50 mM.

24. The electrochromic device according to claim 17, wherein the concentration of the anodic and cathodic electron shuttles is at least approximately 5% of the concentration of the anodic and cathodic materials, respectively.

* * * * *